United States Patent Office 2,710,599
Patented June 14, 1955

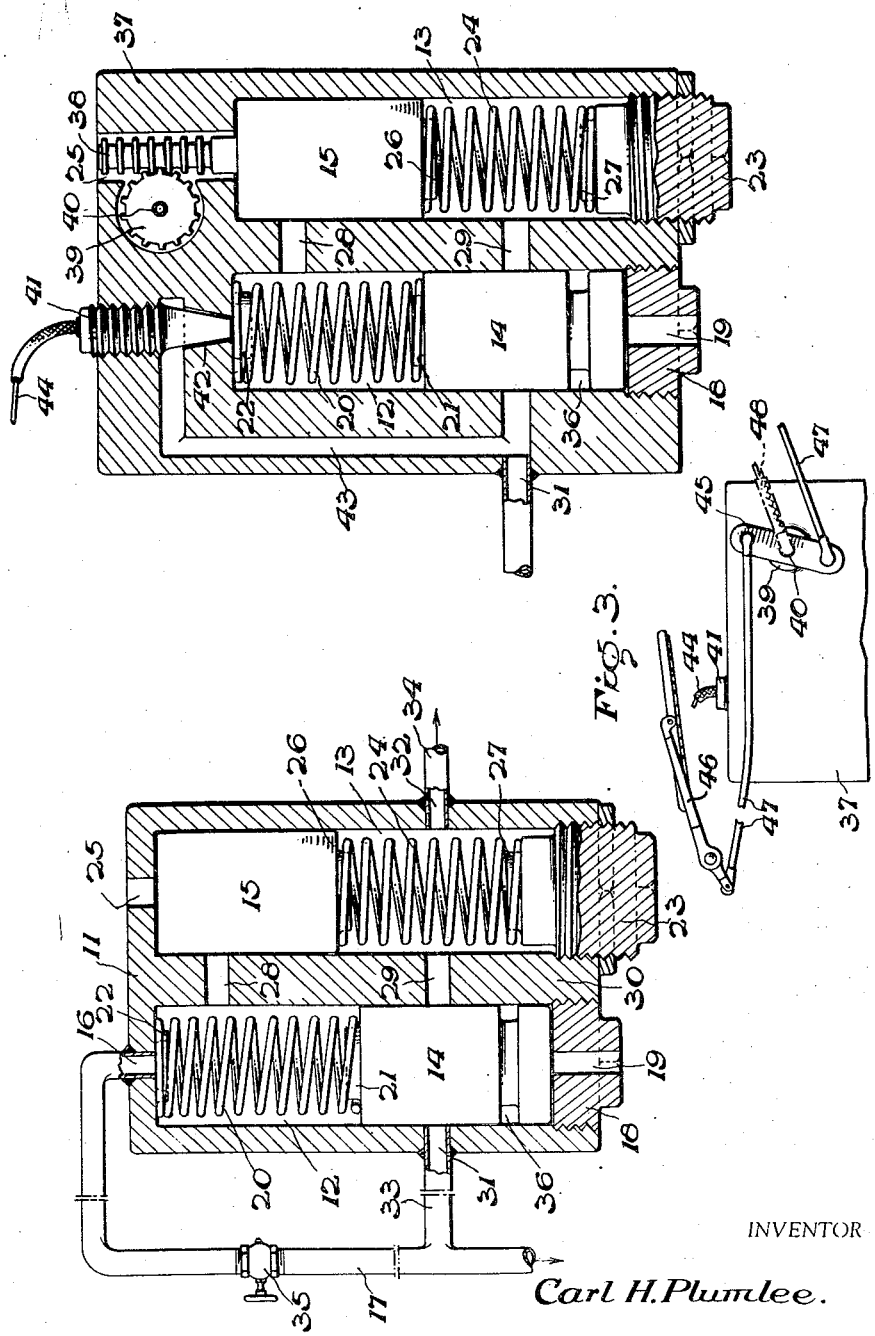

2,710,599

INTERRUPTERS FOR EFFECTING INTERMITTENT ACTUATION

Carl H. Plumlee, United States Navy

Application March 13, 1953, Serial No. 342,047

7 Claims. (Cl. 121—150)

This invention relates to devices for effecting intermittent actuation of mechanisms and has an important application to windshield wiper mechanisms, such as those commonly used on automobiles, airplanes, and other vehicles.

Mechanical windshield wipers are ordinarily powered by a pneumatic or electric motor and are so designed as to oscillate in an arc or to reciprocate within predetermined limits. The oscillations or reciprocations are continuous, that is, a wiper will be moved from one side to the other and then immediately be reversed in direction. Consequently, the wipers are presented as a constantly moving object in front of the vehicle operator.

This performance is especially annoying under the frequently occurring weather conditions in which rain drops are falling lightly. Under such conditions the frequency of oscillation can usually be reduced by control means provided, but slowing down the motion of the wipers constitutes an even greater obstruction to vision. The operator of the vehicle will usually turn the wiper mechanism on until the windshield is clear, then turn it off until sufficient rain-drops have accumulated to make it necessary to turn it on again, and repeating this procedure as the condition prevails. In other words, the operator controls the operation of the windshield wipers for intermittent action by manipulation of the switch.

An object of the present invention is to provide such intermittent action automatically so that the operator can devote his entire attention to the operation of the vehicle.

Another object of the invention is the provision of means for automatically controlling the operations of windshield wipers and other mechanisms to make them function intermittently, including means for varying the frequency of the intermittent action.

A further object is to provide such control means for conventional pneumatic types of windshield wiper mechanisms.

A still further object is to provide a novel type of actuating mechanism which includes automatic intermittent control means.

These and other objects and advantages of the invention will appear more fully from the following description, considered together with the accompanying drawing.

In the drawing:

Fig. 1 is a cross-sectional view of an embodiment of the invention for use on certain types of conventional pneumatic windshield wiper mechanisms.

Fig. 2 is a cross-sectional view of a modified and preferred form of the invention which can be used either as the wiper actuating mechanism or as the intermittent control means for conventional types of actuating mechanisms, including electrical and pneumatic types.

Fig. 3 is a fragmentary view of a typical linkage associated with the embodiment of Fig. 2.

Referring with more particularity to the drawing in which like numerals designate like parts, the embodiment illustrated in Fig. 1 comprises a casing 11 having two cylindrical chambers 12 and 13. Each cylinder has a close fitting piston 14 and 15, respectively, adapted to reciprocate therein. The chamber 12 has a port 16 at the top which is connected by a pipe line 17 to the usual source of vacuum (not shown in Fig. 1) on the vehicle motor, such as the intake manifold of the fuel system. The bottom of the chamber 12 is in the form of a removable threaded plug 18 to permit repair and replacement of parts in the chamber. The plug 18 has a vent 19 open to the atmosphere. The piston 14 is biased to the plug end of the chamber 12 by a compression coil spring 20 disposed between the upper end of the chamber and the top of the piston. The upper end of the piston 14 has an upwardly protecting portion 21 which fits inside the coil spring to hold it in axial alignment. Similar means 22 are provided in the chamber for the upper end of the spring.

The lower end of the chamber 13 is also provided with a removable threaded plug 23 at the bottom, and the piston 15 therein is biased to the upper end of the chamber by a similar coil spring 24 between the lower end of the piston and the plug 23. The plug 23 is solid; unlike the plug 18, it does not have a vent. However, a vent 25, open to the atmosphere, is provided through the upper end wall of chamber 13. A downwardly projecting portion 26 on the bottom of the piston 15 and an upwardly projecting portion 27 on the plug 23, retains the spring 24 in axial alignment.

The two chambers 12 and 13 are intercommunicated by means of an upper duct 28 and a lower duct 29 through the intermediate wall 30 of the casing. These ducts are so positioned that lower duct 29 is closed by the piston 14 in its lower or biased position and the upper duct 28 is closed by the piston 15 in its upper or biased position, substantially as shown.

The casing is also provided with two side ports 31 and 32, one for the chamber 12 and one for the chamber 13, in the same horizontal plane as the lower intercommunicating duct 29. The side port 31 is connected by a pipe 33 to the vacuum feed line 17 and the other side port 32 is connected by a pipe or tube 34 to the usual pneumatic motor (not shown) which actuates the wiper blades.

A throttle 35 is placed in the line 17 between the pipe 33 and the port 16.

The lower end of the piston 14 is provided with an annular recess or groove 36, the purpose of which will be explained hereinafter.

When the valve 35 is closed, the vacuum line 17 is closed to the upper end of the chamber 12 and the piston 14 closes it to pipe 32. When the valve is opened the vacuum line is opened to the top of chamber 12, thereby reducing the pressure on the top of the piston 14. The atmospheric pressure acting on the bottom of the piston 14 through the vent 19 forces the piston upward against the action of the spring 20 until the annular recess 36 is aligned with the port 31 and duct 29, thereby communicating the vacuum line 17 with the line 34 leading to the wiper motor through the pipe 33, port 31, duct 29, and bottom portion of the chamber 13, thus actuating the wipers. The consequent reduction of pressure in the chamber 13 below the piston 15 permits atmospheric pressure acting through the vent 25 to force the piston 15 downwardly against the action of the spring 24. In executing the downward movement, the piston 15 uncovers the upper duct 28, thereby communicating the space in the chamber 12 above the piston 14 with the atmosphere which equalizes the air pressure on the piston 14 and causes the spring 20 to return it to its normally biased position at the bottom of the cylinder. The piston 15 then returns under the action of its spring to the upper part of its chamber, thus completing the cycle.

During the cycle, the vacuum line 17 is open to the wiper line 34 for only a portion of the time to give the intermittent action desired. The frequency of the cycle is controlled by varying the opening of the throttle to a greater or lesser extent. This throttle may be placed on the instrument panel of the vehicle or at some other place convenient to the operator.

This embodiment is particularly adapted for use with those types of wiper mechanisms which include spring-loaded or other like means for biasing the wiper blade arms to their off positions when the motivating force is interrupted. Other types of wiper motors, however, depend upon the motivating force itself to return the wiper arms to the off position when the motor is turned off.

The embodiment illustrated in Fig. 2 is adapted for general use with either type of motor, including electrical as well as pneumatic and, furthermore, may also be used in substitution of the usual motor. It comprises a casing 37, having chambers, pistons, springs, plugs, and internal ports, similar to those of the embodiment of Fig. 1, said parts bearing the same reference numerals. However, it differs from the first embodiment in several essential respects. The side port 32 is closed; the vent 25 is elongated; a vertical rack 38 is mounted for reciprocation in the vent 25 and is secured to the piston 15. A pinion 39 is rotatably mounted in the casing and is in meshed relation with the rack 38. The pinion 39 carries a rocker shaft 40 and the shaft rotates with it. The throttle is disposed within the casing and comprises a threaded valve stem 41 and a valve seat 42, the latter being formed in the casing. Connection between the valve and the side port 31 is through a duct 43.

The cycle of operation is similar to that of the first embodiment, except that the vacuum is not communicated through the device to a separate motor. As the cycle proceeds, the piston 15 on its downstroke carries the rack 38, thereby rotating the pinion 39 and its shaft 40. On the upstroke of the piston 15, the pinion and shaft are rotated in the opposite direction. Hence, the shaft is given an intermittent oscillatory or rocking motion, the cycle frequency being controlled by the extent to which the throttle is opened. The valve stem 41 is connected by a torque cable 44 to a manual control knob (not shown) for the convenience of the operator.

The motion of the rocker shaft 40 may be used in a number of different ways. For example, it may be secured to a rocker arm 45 and the motion of the rocker arm used to operate one or more wiper arms 46, through a suitable linkage, such as push rods 47. Alternatively, the rocker shaft may be connected to the switch (not shown) of an existing pneumatic or electrical wiper motor on the vehicle, or any other device to be intermittently controlled, by a torque cable 48 to turn it off and on intermittently.

Having thus described my invention, I claim:

1. A control device for a fluid motor comprising a casing having a first cylindrical chamber, a second cylindrical chamber, a piston slidably mounted for reciprocation within each of said chambers, resiliently yieldable means biasing said pistons to one end of their respective chambers, said casing also having vents communicating the ends of the chambers to which the pistons are biased with the exterior, valved means for communicating the other end of the first chamber to a source of vacuum, said casing having ducts intercommunicating said chambers at the top and bottom, each duct being normally closed on one side by one of the pistons in its biased position, and opened when the piston is moved toward the other end of the chamber, said casing also having a passageway extending from the first chamber, said passageway being normally closed by the piston in the first chamber, means for communicating said passageway with the duct normally closed by the last-mentioned piston when said last-mentioned duct is open, and means connecting said passageway to a source of vacuum.

2. A control device for a fluid motor comprising a casing having a first cylindrical chamber, a second cylindrical chamber, a piston slidably mounted for reciprocation within each of said chambers, resiliently yieldable means biasing said pistons to one end of their respective chambers, said casing also having vents communicating the ends of the chambers to which the pistons are biased with the exterior, valved means for communicating the other end of the first chamber to a source of vacuum, said casing having ducts intercommunicating said chambers at the top and bottom, each duct being normally closed on one side by one of the pistons in its biased position, and opened when the piston is moved toward the other end of the chamber, said casing also having a passageway extending from the first chamber, said passageway being normally closed by the piston in the first chamber, means for communicating said passageway with the duct normally closed by the last-mentioned piston when said last-mentioned duct is open, means connecting said passageway to a source of vacuum, said casing having a second passageway extending from the second chamber, normally out of contact with the piston therein, and communicating with the duct normally held closed by the other piston, and a feed line having one end connected to said second passageway.

3. A control device for a fluid motor comprising a casing having a first cylindrical chamber, a second cylindrical chamber, a piston slidably mounted for reciprocation within each of said chambers, resiliently yieldable means biasing said pistons to one end of their respective chambers, said casing also having vents communicating the ends of the chambers to which the pistons are biased with the exterior, valved means for communicating the other end of the first chamber to a source of vacuum, said casing having ducts intercommunicating said chambers at the top and bottom, each duct being normally closed on one side by one of the pistons in its biased position, and opened when the piston is moved toward the other end of the chamber, said casing also having a passageway extending from the first chamber, said passageway being normally closed by the piston in the first chamber, means for communicating said passageway with the duct normally closed by the last-mentioned piston when said last-mentioned duct is open, means connecting said passageway to a source of vacuum, a rack disposed in the vent of the second chamber, said rack being connected to the piston therein for reciprocation therewith, a pinion in meshed relation with said rack, and a shaft connected to said pinion for rotation therewith.

4. A control device for a fluid motor comprising a casing having a first cylindrical chamber, a second cylindrical chamber, a piston slidably mounted for reciprocation within each of said chambers, resiliently yieldable means biasing said pistons to one end of their respective chambers, said casing also having vents communicating the ends of the chambers to which the pistons are biased with the exterior, valved means for communicating the other end of the first chamber to a source of vacuum, said casing having ducts intercommunicating said chambers at the top and bottom, each duct being normally closed on one side by one of the pistons in its biased position, and opened when the piston is moved toward the other end of the chamber, said casing also having a passageway extending from the first chamber, said passageway being normally closed by the piston in the first chamber, means for communicating said passageway with the duct normally closed by the last-mentioned piston when said last-mentioned duct is open, means connecting said passageway to a source of vacuum, a rack disposed in the vent of the second chamber, said rack being connected to the piston therein for reciprocation therewith, a pinion in meshed relation with said rack, a shaft connected to said pinion for rotation therewith, and an oscillatable mechanism connected to said shaft.

5. A device as defined by claim 1 in which the valved means comprises a valve seat, a valve stem rotatable relative to the seat and a torque cable having one end connected to the stem.

6. A device as defined by claim 1 in which at least one end wall of each chamber is removable.

7. A device as defined by claim 1 in which at least one end wall of each chamber comprises a removable plug.

References Cited in the file of this patent

UNITED STATES PATENTS

| | | |
|---|---|---|
| 802,954 | Waterman | Oct. 24, 1905 |
| 1,790,384 | Lincoln | Jan. 27, 1931 |
| 2,298,457 | Berges | Oct. 13, 1942 |
| 2,348,722 | Boehm | May 16, 1944 |
| 2,385,151 | Miller | Sept. 18, 1945 |
| 2,594,577 | McFarland | Apr. 29, 1952 |
| 2,644,863 | Fryklund | July 7, 1953 |